Sept. 29, 1942.  G. FARINA  2,297,396

HIGH PRESSURE HYDRAULIC PISTON PACKING

Filed Nov. 13, 1939

INVENTOR.
GIOVANNI FARINA
BY
ATTORNEY.

Patented Sept. 29, 1942

2,297,396

UNITED STATES PATENT OFFICE 2,297,396

HIGH PRESSURE HYDRAULIC PISTON PACKING

Giovanni Farina, Turin, Italy; vested in the Alien Property Custodian

Application November 13, 1939, Serial No. 304,088
In Italy November 15, 1938

2 Claims. (Cl. 309—33)

This invention relates to improvements in packings for hydraulic pistons, of the type in which the packing constituted by flexible material, such as rubber, is caused to strongly adhere to the cylinder wall by the pressure fluid so that the higher the pressure of the fluid the greater is the friction between packing and cylinder.

The high friction produces in the known types of rubber packings frequent tearing of the rim of the packing adhering to the cylinder from the remaining part which is held by the piston.

According to this invention, the packing comprises an outer layer of fabric impregnated with lubricating substances, such as graphite so that, notwithstanding the strong adherence due to the high pressure, the friction between packing and cylinder is comparatively low and does not bring about the above mentioned drawback.

The annexed drawing shows diagrammatically two embodiments of this invention.

Figure 1:
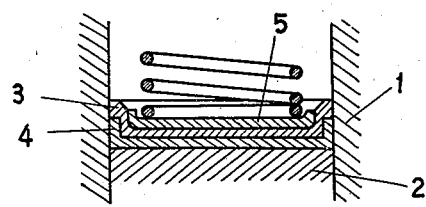
Figure 2:
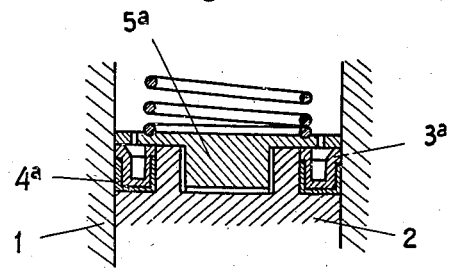

Fig. 1 is an axial section of a piston having a cup-shaped packing and Fig. 2 shows a piston provided with a ring-shaped packing.

Referring to Fig. 1, a piston 2 slidable in a cylinder 1 is provided with a packing constituted by a rubber cup 3 pressed on the piston surface by a spring and a washer 5.

The pressure fluid causes the cup rim to expand and adhere to the cylinder wall. The higher the pressure, the stronger will be the friction between the cup-shaped packing and wall.

The cup rim tends therefore to stick to the cylinder and separate from the piston. According to this invention in order to remove this drawback, the cup-shaped packing is lined on its outer surface nearly up to its edge with a layer 4 constituted by a fabric impregnated with lubricating substances, such as graphite or the like, which forms a smooth and homogeneous surface and allows the cup to slide on the cylinder walls even under high pressure.

Fig. 2 is a sectional view of a hydraulic piston fitted with a ring-shaped packing of U-section, in which the rubber ring 3a, held by a pad 5a, is lined on its outer surface with a layer 4a of fabric impregnated with graphite, according to this invention and for the purpose as stated.

What I claim is:

1. In combination with a cylinder and a piston slidable in said cylinder, a ring-shaped packing of U-section comprising an outer lining for said packing constituted by fabric impregnated with graphite, and an inner ring-shaped rubber member, said outer fabric lining extending to the lower edge of said rubber member, the outer edge of said rubber member being adapted to slide on the inner surface of said cylinder, and a washer pad for pressing said packing against said piston.

2. In combination with a cylinder and a piston slidable in said cylinder, a packing comprising a cup-shaped layer arranged adjacent said piston and consisting of fabric impregnated with graphite, a rubber cup arranged on said fabric layer opposite said piston, said fabric layer extending to the edge of said rubber cup adjacent the inner walls of said cylinder, and a washer for pressing said rubber cup towards said piston, whereby said fabric layer lubricates the cylinder walls and prevents tearing of said rubber cup.

GIOVANNI FARINA.